United States Patent
Bayer et al.

(10) Patent No.: US 6,763,746 B2
(45) Date of Patent: Jul. 20, 2004

(54) ADJUSTING DEVICE AND ASSOCIATED ACTUATING TOOL

(75) Inventors: Benjamin Bayer, Schoenaich (DE); Roland Gamisch, Boeblingen (DE); Bernd Kraemer, Holzgerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 36 days.

(21) Appl. No.: 10/176,373

(22) Filed: Jun. 21, 2002

(65) Prior Publication Data

US 2003/0010164 A1 Jan. 16, 2003

(30) Foreign Application Priority Data

Jun. 23, 2001 (DE) .......................................... 101 30 411

(51) Int. Cl.[7] .............................................. B25B 11/00
(52) U.S. Cl. ............................................. 81/484; 81/55
(58) Field of Search .......................... 29/271; 81/484, 81/13, 55; 411/389, 185, 432

(56) References Cited

U.S. PATENT DOCUMENTS

| | | | |
|---|---|---|---|
| 3,889,558 A | * | 6/1975 | Duncan ........................ 81/55 |
| 4,329,892 A | * | 5/1982 | Daigle ........................... 81/55 |
| 5,333,978 A | | 8/1994 | Rives |
| 6,598,500 B1 | * | 7/2003 | Chivington .................... 81/55 |

FOREIGN PATENT DOCUMENTS

| DE | 3908476 | 9/1990 |
|---|---|---|
| DE | 19527115 | 1/1997 |

* cited by examiner

*Primary Examiner*—D. S. Meislin
(74) *Attorney, Agent, or Firm*—Crowell & Moring LLP

(57) ABSTRACT

The invention relates to a device for adjusting a relative position between two components, having a support part which is fastened to the one component and has a through-opening in a holder section. The device includes a setting screw which has an external thread that engages in the region of its one end in an internal thread firmly arranged on the other component. The setting screw has rotary actuating means on its other end, has a radially projecting, fixed collar between its ends, and passes through the through-opening on a side of the collar remote from the other component. The setting screw carries a lock nut on a side of the holder section remote from the other component, the collar and lock nut axially restraining the holder section between them for fixing a relative position between setting screw and support part.

18 Claims, 2 Drawing Sheets

ADJUSTING DEVICE AND ASSOCIATED ACTUATING TOOL

BACKGROUND AND SUMMARY OF THE INVENTION

The present invention relates to a device for adjusting a relative position between two components and to a tool for actuating such an adjusting device.

In many fields of technology, it is necessary to set or adjust in a relatively accurate manner the relative position between two components. In the course of series production, the two components, during pre-assembly or during fitting, are first positioned relative to one another only in a relatively coarse manner. The setting of the desired relative position, that is to say the adjustment of the two components, is then effected in a subsequent production step. In order to be able to realize such setting, adjusting devices of the type mentioned at the beginning are necessary. These adjusting devices permit coarse pre-setting and fine setting and also fixing of the located adjusting position.

For example, in a motor vehicle, in particular in a passenger car, a windscreen-wiper support unit must be positioned relatively accurately in the vehicle. Such a windscreen-wiper support unit mounts the windscreen wiper or wipers of the vehicle, in which case it may be important for the spatial orientation of the windscreen-wiper axis to be as exact as possible. In particular in the case of modern flat-spar windscreen wipers, it is important that the spatial orientation of the windscreen wiper or of its wiper axis is as exact as possible. On account of production tolerances, the windscreen-wiper support unit has to be adjusted after it has been fitted. There is therefore the need for an adjusting device, by means of which the adjustment of, for example, such a windscreen-wiper support unit relative to a part fixed to the body is simplified.

The present invention deals with the problem of specifying an embodiment for an adjusting device of the type mentioned at the beginning, this embodiment being simple to manipulate and also being relatively inexpensive to produce.

By means of the adjusting device according to the present invention, the relative position between the two components can be set relatively accurately as a function of the thread pitch selected. Furthermore, the adjustment can be carried out relatively simply. A further important advantage is seen in the fact that the components of the adjusting device which are used can be produced inexpensively.

Additionally, with the actuating tool according to the present invention, the adjusting device according to the present invention can be actuated in an especially simple manner for adjusting the two components. As a result, the adjusting operation overall is simplified and can be integrated in series production without any problems.

The problem underlying the present invention is also solved by the use of the adjusting device, by means of which the inclination of a pivot axis of a windscreen wiper relative to a windscreen can be set.

Further important features and advantages of the invention follow from the drawings and the associated description of the figures with reference to the drawings.

It is understood that the above-mentioned features and the features still to be explained below can be used not only in the respectively specified combination but also in other combinations or on their own without departing from the scope of the present invention.

Other objects, advantages and novel features of the present invention will become apparent from the following detailed description of the invention when considered in conjunction with the accompanying drawings.

BRIEF DESCRIPTION OF THE DRAWINGS

A preferred exemplary embodiment of the present invention is shown in the drawings and explained in more detail in the description below.

In the drawings in each case schematically.

DETAILED DESCRIPTION OF THE DRAWINGS

Figure 1:
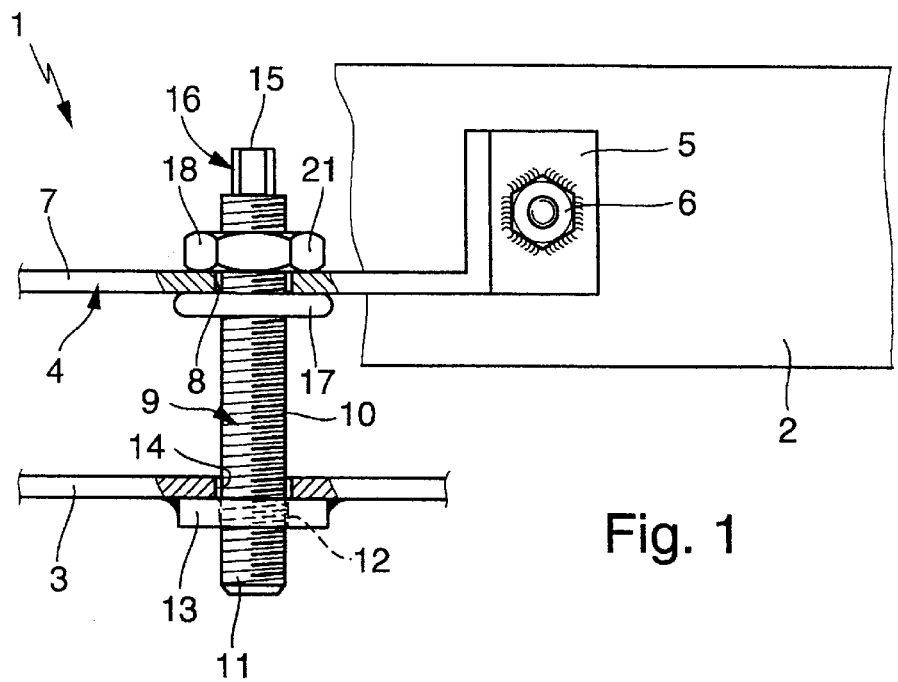
FIG. 1 shows a partly sectioned view of an adjusting device according to the invention.

In accordance with FIG. 1, the relative position between a first component 2 and a second component 3 is to be set and fixed by means of an adjusting device 1 according to the present invention. For this purpose, the adjusting device 1 has a support part 4 which is fastened to the first component 2. For the fastening, the support part 4 in this case has a strap 5, to which a nut 6 is welded, i.e., a "welding nut". By means of this welding nut 6, the support part 4 can be firmly screwed to the first component 2. The support part 4 is expediently of symmetrical design, so that the support part 4 is fastened to the first component 2 by a further strap (not shown) with associated welding nut. In addition, the support part 4 has a preferably flat holder section 7 which contains a through-opening 8. This through-opening 8 may be of slot-shaped design for example.

Furthermore, the adjusting device 1 has a setting screw 9 which has an external thread 10. In the region of its first end 11 shown at the bottom in FIG. 1, the setting screw 9 interacts with an internal thread 12 which is firmly arranged on the second component 3. In the exemplary embodiment shown here, this internal thread 12 is formed on a welding nut 13 which is welded to the second component 3. The second component 3 has a through-opening 14 in alignment with the internal thread 12, and the setting screw 9 passes with clearance through this through-opening 14.

At its second end 15 shown at the top in FIG. 1, the setting screw 9 has rotary actuating means 16, which in this case are designed in the shape of an external polygon, in particular an external hexagon. In another embodiment, these rotary actuating means may also be designed as an internal polygon, e.g., as an internal hexagon or internal Torx. Between its ends 11, 15, the setting screw 9 has a collar 17 which projects radially outwards and is firmly formed on the setting screw 9. This collar 17 is preferably brazed or welded to the setting screw 9, caulked to the latter or made in one piece with it. The setting screw 9 passes through the through-opening 8 of the support part 4 on a side of the collar 17 remote from the second component 3. The through-opening 8 has corresponding clearance relative to the setting screw 9. On a side of the support part 4 remote from the second component 3, a lock nut 18 is screwed onto the setting screw 9. In order to be able to put this lock nut 18 onto the setting screw 9 even when collar 17 is present, the rotary actuating means 16 of the setting screw 9 are expediently dimensioned in such a way that they have a smaller external cross section than the external thread 10. This ensures that the lock nut 18 can be screwed onto the external thread 10 over these rotary actuating means 16.

The adjusting device 1 according to the present invention works as follows:

To adjust the relative position between first component 2 and second component 3, the lock nut 18 is turned relative to the setting screw 9 in the direction of opening until the setting screw 9 is rotationally adjustable relative to the support part 4. In the process, the support part 4 is positioned axially between lock nut 18 and collar 17. The setting screw 9 is then turned. By this rotary actuation of the setting screw 9, the second component 3 moves upwards or downwards along the setting screw 9. Since the setting screw 9 is axially fixed relative to the support part 4, and the support part 4 in turn is firmly connected to the first component 2, this results in a relative adjustment between first component 2 and second component 3. As soon as the desired relative position between the two components 2 and 3 is reached, the lock nut 18 is turned relative to the setting screw 9 in such a way that the support part 4 is axially restrained between collar 17 and lock nut 18. This restraint fixes the rotary position of the setting screw 9 and thus the set adjusting position of the two components 2 and 3.

Figure 2:
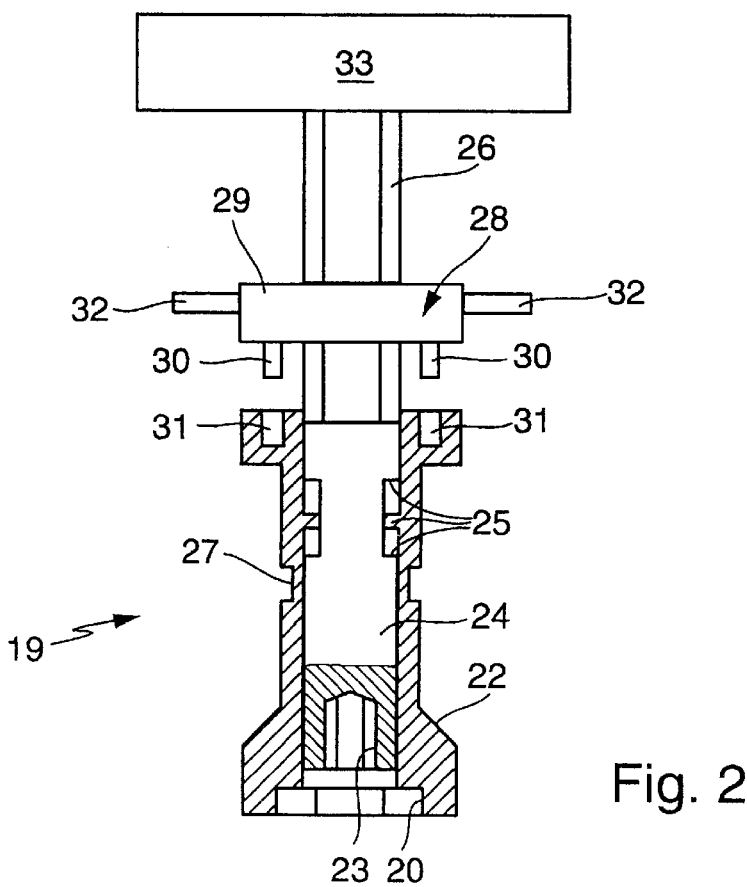
FIG. 2 shows a partly sectioned view of an actuating tool according to the invention.

In accordance with FIG. 2, an actuating tool 19 according to the present invention, which can be used for actuating the adjusting device 1 according to FIG. 1, has an external rotary drive 20 which is designed to be complementary to rotary drive means 21 of the lock nut 18. In the present exemplary embodiment, the lock nut 18 has an external polygon, in particular an external hexagon, as rotary drive means 21; accordingly, the external rotary drive 20 of the actuating tool 19 is configured as an internal polygon, e.g., internal hexagon. Here, this external rotary drive 20 is formed on a sleeve-shaped rotary part 22.

In addition, the actuating tool 19 has an internal rotary drive 23 which is designed to be complementary to the rotary drive means 16 of the setting screw 9. Accordingly, this internal rotary drive 23 is in this case configured as an internal polygon, specifically as an internal hexagon. The internal rotary drive 23 is formed on a cylindrical rod 24 which is arranged concentrically in the rotary part 22 in a rotationally adjustable manner. Furthermore, the rod 24 is arranged so as to be axially adjustable in the rotary part 22, stop means 25 limiting the axial adjustability between rod 24 and rotary part 22.

Formed on the rod 24, in accordance with FIG. 2, above the rotary part 22 are first rotary drive means 26, with which the rod 24, and thus the internal rotary drive 23, can be driven for performing a rotary adjustment. Here, these first rotary drive means 26 are designed in the shape of an external polygon, in particular an external hexagon, on which a suitable tool can act. The rotary part 22 has second rotary drive means 27, by means of which the rotary part 22 can be driven for performing a rotary adjustment of the external rotary drive 20. These second rotary drive means may likewise be configured as an external polygon or also as parallel surfaces, on which a corresponding tool, e.g., a spanner, in particular an open-end spanner, can act.

In addition, the actuating tool 19 has coupling means 28, which can be adjusted between an activated state and a deactivated state. In the activated state, these coupling means 28 effect a rotationally fixed coupling between external rotary drive 20 and internal rotary drive 23. In the deactivated state, the coupling means 28 permit free relative rotations between internal rotary drive 23 and external rotary drive 20. In the present case, the coupling means 28 consist of a bush 29 which contains a passage (not shown here) in its interior, this passage being formed so as to be complementary to the first rotary drive means 26, so that the bush 29, although axially adjustable along the first rotary drive means 26, is connected to the rod 24 in a rotationally fixed manner and thus to the internal rotary drive 23 in a rotationally fixed manner via the first rotary drive means 26. A plurality of axially projecting pins 30 are formed on the bush 29 on an axial side facing the rotary part 22. Complementary thereto, corresponding pin receptacles 31 are formed on an axial end face of the rotary part 22 facing the bush 29. In the deactivated state, the pins 30 and the pin receptacles 31 are disengaged, so that the rotary drives 20 and 23 are rotatable relative to one another. In the activated state, the pins 30 engage in their pin receptacles 31, as a result of which the rotary part 22 is connected to the bush 29 in a rotationally fixed manner and thus to the rod 24 in a rotationally fixed manner. This results in the rotationally fixed coupling between the rotary drives 20 and 23.

In addition, formed in this case on the bush 29 are radially projecting arms 32 which can be used as handles. A handle 33 with which the internal rotary drive 23 can be rotationally actuated via the rod 24 is attached to the rod 24 at an end remote from the internal rotary drive 23.

The actuating tool 19 according to the present invention works as follows:

To slacken the lock nut 18, the external rotary drive 20 is put onto the rotary drive means 21 of the lock nut 18. In addition, the internal rotary drive 23 is put onto the rotary drive means 16 of the setting screw 9. The coupling means 28 are deactivated, so that the rotary part 22 is rotationally adjustable relative to the rod 24. Accordingly, for the slackening, the lock nut 18 can be turned relative to the setting screw 9 by the rotary part 22 being turned relative to the rod 24. In the process, the rod 24 is expediently positioned in a rotationally fixed manner via the handle 33. Two parallel milled surfaces for receiving an open-end spanner having, for example, a width across the flats of SW 17 are arranged at the top on the rotary part 22.

To adjust the components 2 and 3, the coupling means 28 are now activated, so that rotary part 22 and rod 24 are coupled to one another in a rotationally fixed manner. The rod 24 and rotary part 22 are now turned together by a rotary actuation on the handle 33. In a corresponding manner, the setting screw 9 rotates in the process without the position of the lock nut 18 relative to the setting screw 9 changing at the same time. Consequently, the axial positioning of the support part 4 between collar 17 and lock nut 18 is retained. To fix the located adjusting position, the coupling means 28 are deactivated again, and, with handle 33 firmly held, the lock nut 18 can be tightened again by turning the rotary part 22. The axial adjustability between rod 24 and rotary part 22 ensures a maximum overlap between internal rotary drive 23 and the rotary drive means 16 of the setting screw 9 or between external rotary drive 20 and the rotary drive means 21 of the lock nut 18 irrespective of the length of that section of the setting screw 9 which projects beyond the lock nut 18 on a side remote from the second component 3.

Figure 3:
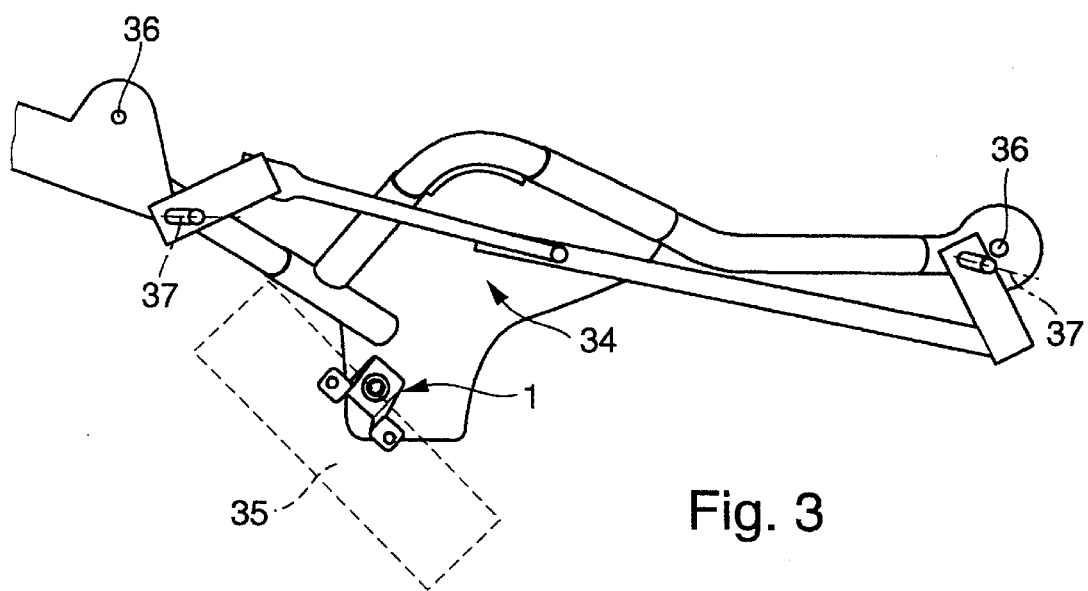
FIG. 3 shows a perspective view of a specific embodiment of the adjusting device according to the invention.

In accordance with FIG. 3, the adjusting device 1 according to the present invention is especially suitable for adjusting a relative position between a windscreen-wiper support unit 34 and a splashboard 36, which is symbolized here by a frame shown by broken lines. The windscreen-wiper support unit 34 is fastened below a windscreen (not shown) of a motor vehicle, in particular a passenger car, to the vehicle body via at least two fastening points 36. In this case, these fastening points 36 are provided with damping means which permit relative movements between the windscreen-wiper support unit 34 and the vehicle body. Furthermore, the windscreen-wiper support unit 34 is fastened to the splashboard 35 via the adjusting device 1, this splashboard 35 being arranged in the engine compartment of the motor vehicle and being firmly connected to the vehicle body. The relative position between the windscreen-wiper support unit 34 and the splashboard 35 can now be set relatively accurately by means of the adjusting device 1. With the splashboard 35 in a fixed position, a rotary actuation of the setting screw 9 results in a tilting movement of the windscreen-wiper support unit 34 about a straight line passing through the fastening points 36. In this way, the inclination of pivot axes 37 relative to the windscreen can be set. A windscreen wiper (not shown), in particular a flat-spar windscreen wiper, is in each case mounted on these pivot axes 37. The adjustment which can be carried out with the adjusting device 1 according to the present invention is relatively accurate, since the relative position between the two components 34 and 35 changes only relatively slightly during a turn of the setting screw 9. In the special embodiment shown in FIG. 3, the splashboard 35 corresponds to the first component 2 from FIG. 1, whereas the windscreen-wiper support unit 34 forms the second component 3 according to FIG. 1.

A particular advantage of the adjusting device 1 according to the present invention, in particular in combination with the actuating tool 19 according to the present invention, is seen in the fact that a precise adjustment and its fixing can be carried out relatively simply and thus in a controlled manner and quickly, so that the invention can be used in particular in conjunction with series production. Furthermore, the adjusting device according to the invention is relatively inexpensive to produce.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. structural arrangement including a first component, a second component, and a device for adjusting a relative position between the first and second components, the device having a support part which is fastened to the first component and has a through-opening in a holder section, and having a setting screw which:
    has an external thread,
    engages in a region of a first end in an internal thread firmly arranged on the second component,
    has rotary actuating means on a second end,
    has a radially projecting, fixed collar between the first and second ends,
    passes through the through-opening on a side of the collar remote from the second component, and
    carries a lock nut on a side of the holder section remote from the second component,
    the collar and lock nut axially restraining the holder section between them for fixing a relative position between the setting screw and the support part.

2. The structural arrangement according to claim 1, wherein the rotary actuating means of the setting screw has a smaller external cross section than the external thread in such a way that the lock nut can be screwed onto the external thread of the setting screw over the rotary actuating means.

3. The structural arrangement according to claim 2, wherein the rotary actuating means of the setting screw is designed as an external polygon or as an internal polygon.

4. The structural arrangement according to claim 1, wherein the through-opening has radial clearance relative to the external thread of the setting screw.

5. The structural arrangement according to claim 1, wherein the second component is formed by a windscreen-wiper support unit which serves to mount one or more windscreen wipers of a motor vehicle, the first component being formed by a body part or by an element fixed to the body.

6. The structural arrangement according to claim 5, wherein the first component is formed by a splashboard arranged in an engine compartment of the motor vehicle and firmly connected to the body.

7. In combination with the structural arrangement of claim 1, a tool for actuating the adjusting device having an external rotary drive which is designed to be complementary to a rotary drive means of the lock nut,
    having an internal rotary drive which is designed to be complementary to the rotary actuating means of the setting screw,
    the internal rotary drive and external rotary drive being designed to be rotatable relative to one another, and
    coupling means being provided which, in an activated state, couple the internal rotary drive and the external rotary drive to one another in a rotationally fixed manner and, in a deactivated state, permit relative rotations between the internal rotary drive and the external rotary drive.

8. The actuating tool according to claim 7, wherein the internal rotary drive is designed to be axially adjustable relative to the external rotary drive.

9. The actuating tool according to claim 7, wherein a first handle is provided for the rotary actuation of the internal rotary drive.

10. The actuating tool according to claim 9, wherein a second handle is provided for the rotary actuation of the external rotary drive.

11. The actuating tool according to claim 7, wherein first rotary drive means are provided for the rotary actuation of the internal rotary drive by means of a tool.

12. The actuating tool according to claim 11, wherein second rotary drive means are provided for the rotary actuation of the external rotary drive by means of a tool.

13. The structural arrangement of claim 5 wherein a relative position between the windscreen-wiper support unit and the body part or the element fixed to the body of the motor vehicle is adjusted.

14. A device for adjusting a relative position between a first component and a second component, comprising:
    a support part fastened to the first component, the support part having a holder section and an aperture defined by the holder section;
    a setting screw having an external thread, wherein the setting screw engages an internal thread of the second component at a first end of the setting screw and wherein the setting screw is disposed through the aperture of the holder section at a second end of the setting screw;
    a collar fixed on the setting screw between the first and second components;
    a rotary actuating mechanism disposed on the second end of the setting screw; and
    a lock nut disposed on the second end of the setting screw on a side of the holder section opposed from the second component;
    wherein the holder section is disposed between the lock nut and the collar.

15. An adjustment tool, comprising:

an external rotary drive;

an internal rotary drive, wherein the internal rotary drive is disposed within the external rotary drive and is rotatable within the external rotary drive and axially adjustable within the external rotary drive;

a first rotary drive actuator coupled to the internal rotary drive for rotating the internal rotary drive;

a second rotary drive actuator disposed on the external rotary drive for rotating the external rotary drive; and a coupler selectively engageable with the external and internal rotary drive, wherein when the coupler engages both the external and internal rotary drives the external and internal rotary drives are rotationally fixed together and when the coupler is disengaged from one of the external and internal rotary drives the external and internal rotary drives rotate independently.

16. The adjustment tool of claim 15 wherein the coupler includes an axially projecting pin and wherein the external rotary drive defines an aperture on an axial end face thereof, the projecting pin disposed within the external rotary drive aperture when the coupler engages both the external and internal rotary drives.

17. The adjustment tool of claim 16 wherein the coupler is disposed on the first rotary drive actuator and is axially moveable on the first rotary drive actuator.

18. An apparatus for adjusting a relative position of a first component and a second component, comprising:

an adjustment device including:
- a support part fastened to the first component, the support part having a holder section and an aperture defined by the holder section;
- a setting screw having an external thread, wherein the setting screw engages an internal thread of the second component at a first end of the setting screw and wherein the setting screw is disposed through the aperture of the holder section at a second end of the setting screw;
- a collar fixed on the setting screw between the first and second components;
- a rotary actuating mechanism disposed on the second end of the setting screw; and
- a lock nut disposed on the second end of the setting screw on a side of the holder section opposed from the second component;
- wherein the holder section is disposed between the lock nut and the collar; and an adjustment tool including:
- an external rotary drive;
- an internal rotary drive, wherein the internal rotary drive is disposed within the external rotary drive and is rotatable within the external rotary drive and axially adjustable within the external rotary drive;
- a first rotary drive actuator coupled to the internal rotary drive for rotating the internal rotary drive;
- a second rotary drive actuator disposed on the external rotary drive for rotating the external rotary drive; and
- a coupler selectively engageable with the external and internal rotary drives, wherein when the coupler engages both the external and internal rotary drives the external and internal rotary drives are rotationally fixed together and when the coupler is disengaged from one of the external and internal rotary drives the external and internal rotary drives rotate independently;
- wherein the lock nut is engageable with the external rotary drive and the rotary actuating mechanism is engageable with the internal rotary drive.

* * * * *